United States Patent

Morimoto et al.

[11] Patent Number: 5,325,350
[45] Date of Patent: Jun. 28, 1994

[54] PICK-UP FOR SELECTIVELY READING AND WRITING AN OPTICAL RECORDING MEDIUM HAVING PITS AND MAGNETIC DOMAINS

[75] Inventors: Yasuaki Morimoto; Friedhelm Zucker, both of Villingen-Schwenningen; Christian Büchler; Heinz-Jörg Schröder, both of Marbach, all of Fed. Rep. of Germany

[73] Assignee: Deutsche Thomson-Brandt GmbH, Hanover, Fed. Rep. of Germany

[21] Appl. No.: 78,346

[22] Filed: Jun. 21, 1993

Related U.S. Application Data

[60] Division of Ser. No. 826,676, Jan. 27, 1992, Pat. No. 5,251,196, which is a continuation of Ser. No. 250,732, Sep. 28, 1986, abandoned.

[30] Foreign Application Priority Data

Sep. 30, 1987 [DE] Fed. Rep. of Germany .... 3732874.3

[51] Int. Cl.$^5$ .............................................. G11B 7/00
[52] U.S. Cl. ............................. 369/110; 369/13; 369/275.2; 369/120; 360/114
[58] Field of Search ............. 369/110, 13, 112, 44.12, 369/44.41, 275.4, 120, 275.2; 360/114

[56] References Cited

U.S. PATENT DOCUMENTS

| | | | |
|---|---|---|---|
| 4,985,881 | 1/1991 | Saito et al. | 369/13 |
| 5,014,253 | 5/1991 | Morimoto et al. | 369/13 |
| 5,031,162 | 7/1991 | Morimoto et al. | 369/13 |
| 5,202,874 | 4/1993 | Zucker et al. | 369/54 |
| 5,251,196 | 10/1993 | Morimoto et al. | 369/110 |

Primary Examiner—Paul M. Dzierzynski
Assistant Examiner—Kim-Kwok Chu
Attorney, Agent, or Firm—Max Fogiel

[57] ABSTRACT

The beam of light reflected from an optico-magnetic recorded medium is reflected by an optical pick-up onto one optical or another in accordance with the direction that the beam's plane of polarization is rotated in. A data signal is obtained from the difference in the photo-voltages of the two photodetectors.

19 Claims, 8 Drawing Sheets

PICK-UP FOR SELECTIVELY READING AND WRITING AN OPTICAL RECORDING MEDIUM HAVING PITS AND MAGNETIC DOMAINS

The present application is a division of the parent application Ser. No. 826,676 filed Jan. 27, 1992, now U.S. Pat. No. 5,251,196 which is a file-wrapper-continuation of application Ser. No. 250,732 filed Sep. 28, 1988 (now abandoned).

The invention concerns an optical pick-up for reading and/or writing an optical and/or optico-magnetic recorded medium, whereby a source projects light on the medium and light reflected by the medium is diverted to one photodetector or another depending on how it is polarized.

The invention also concerns an optical pick-up for reading and/or writing an optical and/or optico-magnetic recorded medium, whereby a source projects light on the medium.

One known example of an optical recorded medium is a compact disk, which has a transparent layer on top of a reflecting aluminum layer. The light-reflecting aluminum layer has depressions called "pits" that represent data stored on the disk. The data can be read from the compact disk by means of an optical pick-up because the reflectivity of the light-reflecting aluminum layer depends on the pattern of the depressions in the disk. Less light is reflected from a depression, which is also often called a "groove," than from an elevation, which is often called "land."

From the intensity of the light reflected by the disk accordingly, the optical pick-up determines whether the bit being scanned is a logical one or a logical zero for example.

Another optical pick-up of this type, called an "optico-magnetic disk," is described in the article "Magnetooptische Versuche dauern an" ["Optico-magnetic testing continues"] on pages 37 to 41 of Funkschau 13, 21 (June 1986).

An optico-magnetic disk, in contrast to a conventional compact disk, has no pits. Below the transparent layer is a magnetic layer, in which data can be stored and from which they can be read out. How data can be written onto an optico-magnetic disk will now be described.

A laser beam focused on the disk heats the magnetic layer to above the Curie point. It is, however, usually sufficient to heat the layer to a compensation temperature that is just below the Curie point. An electromagnet is positioned behind the focus on the disk and magnetizes the area heated by the laser in one polarity or another. As the temperatures of the heated points drop below the Curie point again when the laser beam is turned off, the magnetic polarity established by the electromagnet remains in force. It "freezes in." The individual bits are in this way stored in domains of differing magnetic polarity, with one polarity for example representing a logical one and the other a logical zero.

The data can be read out by exploiting the Kerr effect. The plane of polarity of a linearly polarized beam of light is rotated through a measurable angle when reflected onto a magnetized mirror. Depending on the direction that the mirror is magnetized in, the plane of polarization of the reflected beam will be rotated either left or right. Since, however, the individual domains on the disk act like magnetized mirrors, the plane of polarization of a scanning beam of light will be rotated right or left to a measurable extent depending on the magnetic polarity of the domains being scanned at that instant.

From the rotation of the plane of polarization of the beam of light reflected from the disk the optical pick-up determines whether the bit is a logical one or a logical zero. In contrast to a compact disk, an optico-magnetic disk can be erased and rerecorded almost as often as desired.

One innovative new type of disk is a combination compact disk and optico-magnetic disk. Data can be stored on this type of recorded medium in both the magnetic domains and in the pits.

The object of the invention is accordingly to provide an optical pick-up that will be appropriate for reading compact disks, optico-magnetic disks, and the new combination disks.

One embodiment of the invention is characterized in that a signal representing the data stored in the magnetic domains of the recorded medium is obtained from the difference between the photovoltages of the two photodetectors and in that a signal that represents the data stored in the pits in the recorded medium is obtained from the sum of the photovoltages of the photodetectors.

Another embodiment of the invention is characterized in that the recorded medium reflects some of the light onto one photodetector, at the output terminal of which the signal that represents the data stored in the pits in the recorded medium can be obtained, in that some of the light emitted by the source penetrates the recorded medium, in that the light that penetrates the medium is diverted in accordance with its polarity onto a second or onto a third photodetector by a polarizer behind the medium, and in that the output terminals of the second and third photodetectors are connected to the input terminals of a differential amplifier, at the output terminal of which the signal that represents the data stored in the magnetic domains of the recorded medium can be obtained.

Figure 1:
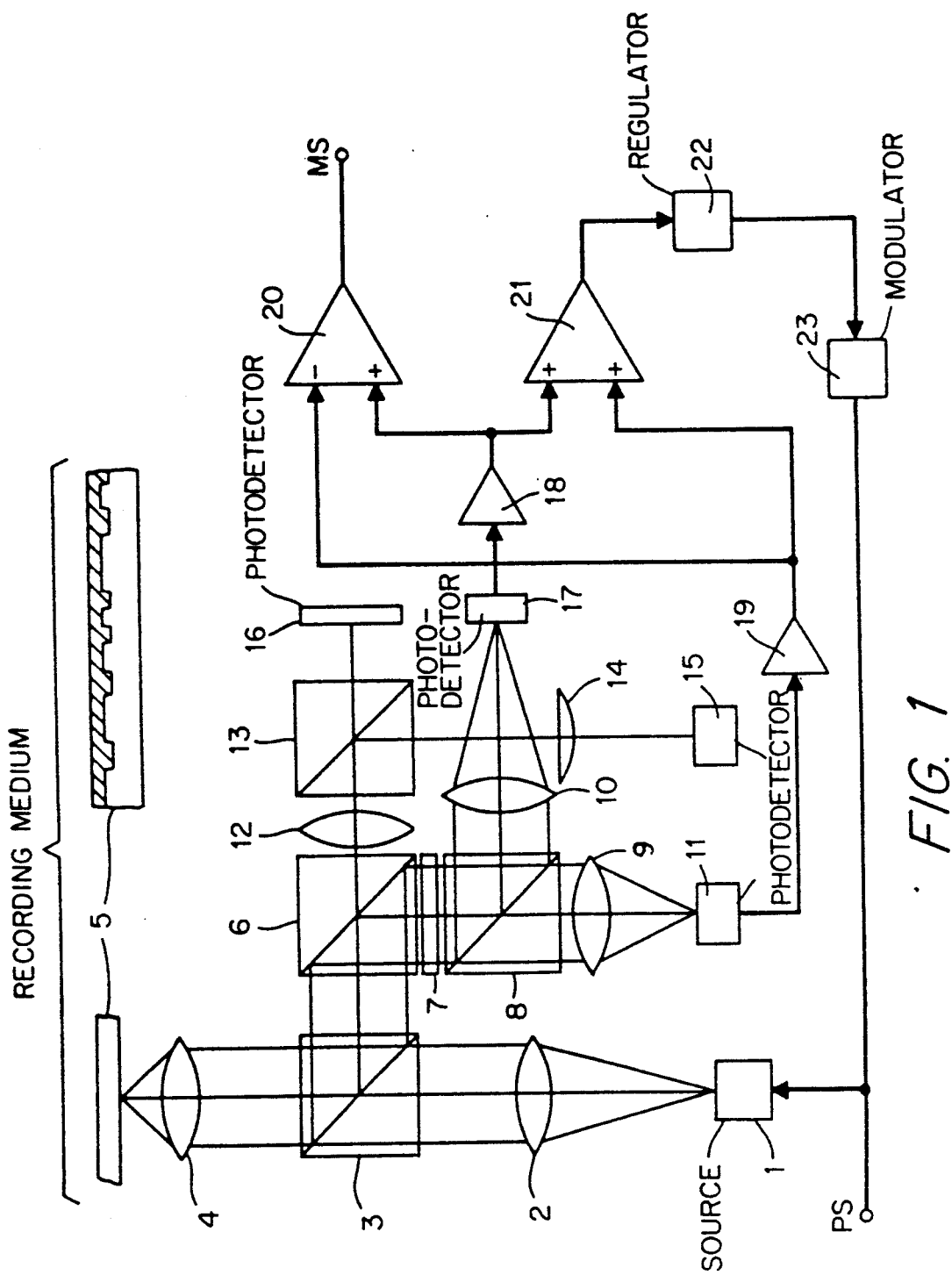
FIG. 1 illustrates one embodiment of the invention.

The data-scanning beam of light illustrated in FIG. 1 is focused by a source 1, usually a laser, onto an innovative recorded medium 5 by way of a lens 2, a prism beam divider 3, and another lens 4. The medium reflects the beam back to prism beam divider 3 through second lens 4. Prism beam divider 3 diverts the reflected beam of light at a right angle onto another prism beam divider 6. Just as it penetrates second prism beam divider 6, the beam of light travels through another lens 12 and strikes still another prism beam divider 13 that diverts a beam of light onto a photodetector 16 comprising for example two photodiodes E and F. A differential amplifier constructs a tracking error $TE = ES - FS$ from the output signals ES and FS of photodiodes E and F in a way that is known in relation to three-beam optical pick-up. Third prism beam divider 13, however, also diverts a beam of light at a right angle through a fourth lens 14 and onto another photodetector 15 comprising for example four photodiodes A, B, C, and D. A focusing error FE=(AS+CS)−(CS+DS) is constructed from their output signals AS, BS, CS, and DS as is conventional with optical pick-ups.

Second prism beam divider 6, however, also diverts a beam of light at a right angle through a g/2 disk 7 and onto a polarized-beam divider 8, which diverts the beam through a fifth lens 9 and onto photodetector 11 when its plane of polarization is rotated in one direction. When on the other hand its plane of polarization is rotated in the other direction, polarized-beam divider 8 diverts the beam through a sixth lens 10 and onto photodetector 17. The photovoltage from photodetector 11 is forwarded through an amplifier 19 to one input terminal of a summation amplifier 21 and to the subtracting input terminal of a differential amplifier 20. The photovoltage from photodetector 17 is forwarded through a third amplifier 18 to the second input terminal of summation amplifier 21 and to the adding input terminal of differential amplifier 20. The output terminal of differential amplifier 20 is connected by way of controls 22 to the input terminal of a modulator 23 that controls the light output of laser 1.

The pits on the new type of recorded medium 5 would cause the intensity of the reflected light to fluctuate constantly and detrimentally superimpose themselves on the data signal at the output terminal of differential amplifier 20. To prevent this overlapping, the intensity of the reflected light is maintained constant by modulator 23, which controls laser 1.

The signal MS that represents the data stored in the magnetic domains of the recorded medium can accordingly be obtained at the output terminal of differential amplifier 20. The data stored in the pits in the recorded medium, however, are not lost. The are represented by the control signal from modulator 23. The signal PS that represents the data stored in the pits in the recorded medium can accordingly be simultaneously obtained at the output terminal of modulator 23.

Figure 2:
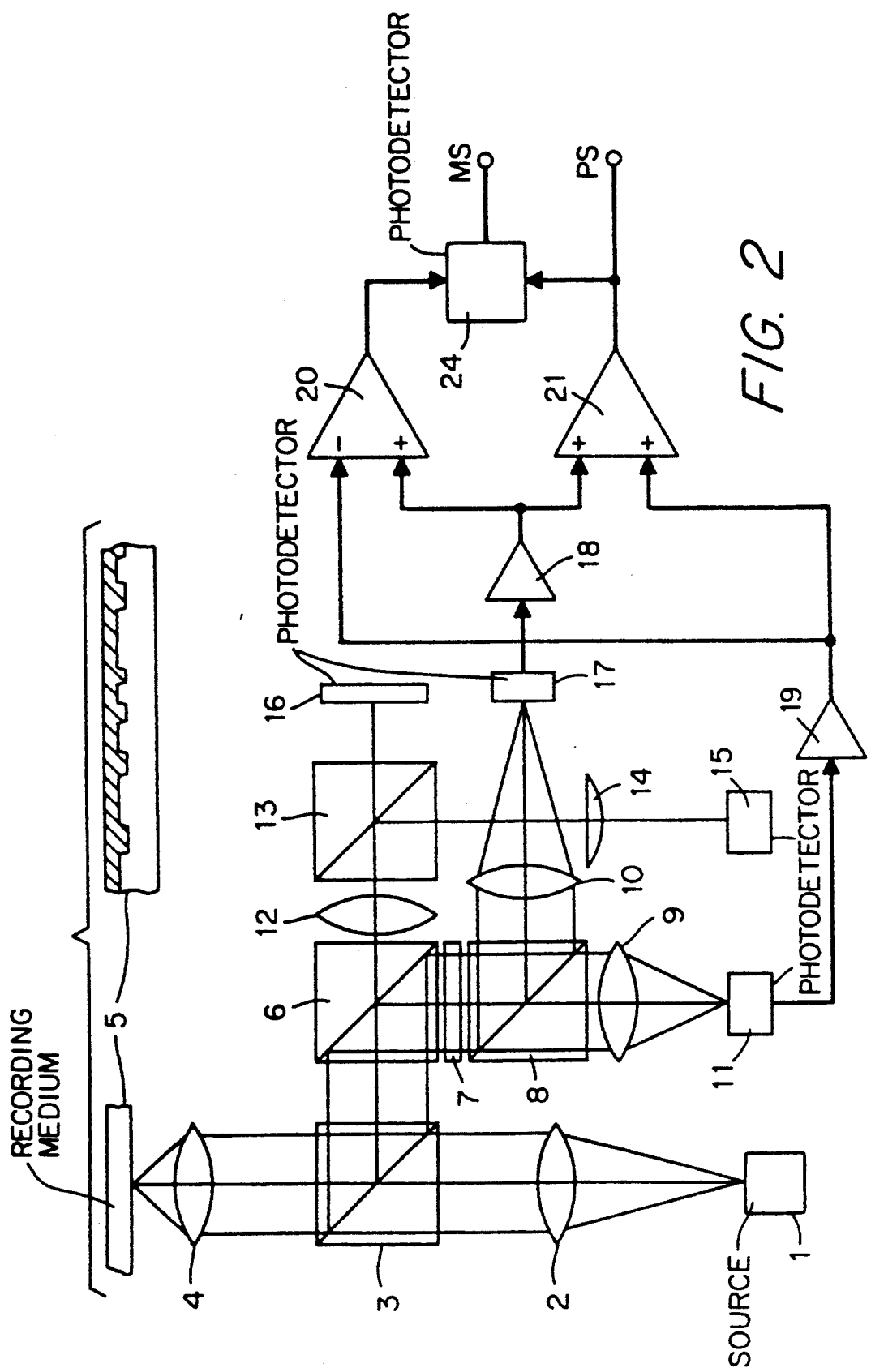
FIG. 2 illustrates another embodiment of the invention.

The second embodiment, illustrated in FIG. 2 differs only slightly from the first. It has no controls 22 or modulator 23. Instead, the output terminal of summation amplifier 21 is connected to the input terminal of a divider 24, the other input terminal of which is connected to the output terminal of differential amplifier 20. Although the modulation product of the signal MS that represents the data stored in the magnetic domains of the recorded medium and of the signal PS that represents the data stored in the pits in the recorded medium is available at the output terminal of differential amplifier 20 in this embodiment, since that product is divided in divider 24 by signal PS, only signal MS is available at the output terminal of the divider. Simultaneously available at the output terminal of summation amplifier 21, however, is the other signal PS that represents the data stored in the pits in the recorded medium.

If for example the pits on the new type of recorded medium are not as deep as approximately ¼ of the wavelength g of the scanning beam of light, as is the case with compact disks, the power of the laser can be diminished. The recorded medium is accordingly not heated to the same extent while it is being read and the margin of safety with respect to the Curie point is more extensive. It turns out to be practical for the pits to be about 1/10 as deep as the wavelength of the scanning beam of light because the modulation will be definitely lower.

Figure 3:
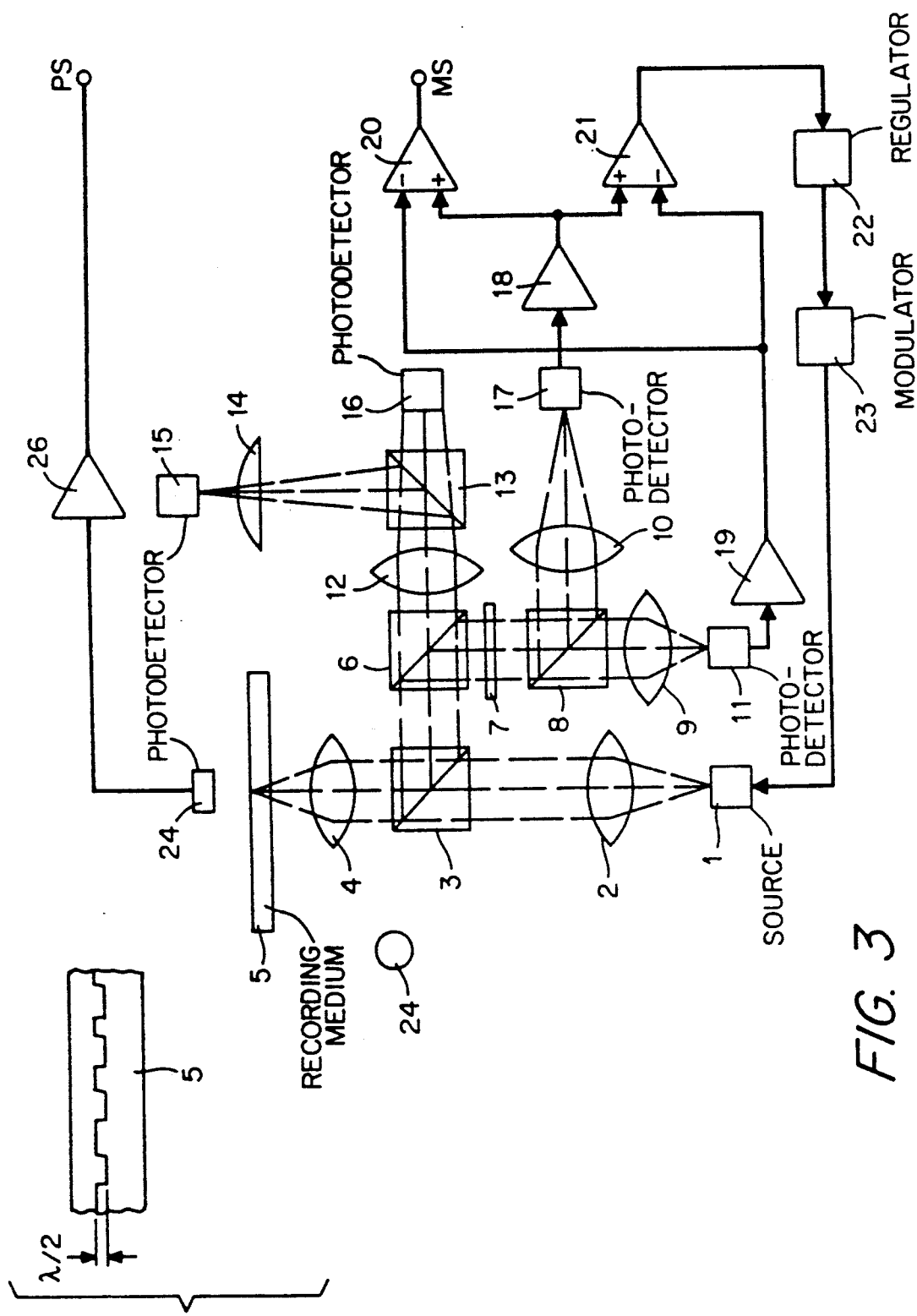
FIG. 3 illustrates a third embodiment of the invention.
Figure 8:
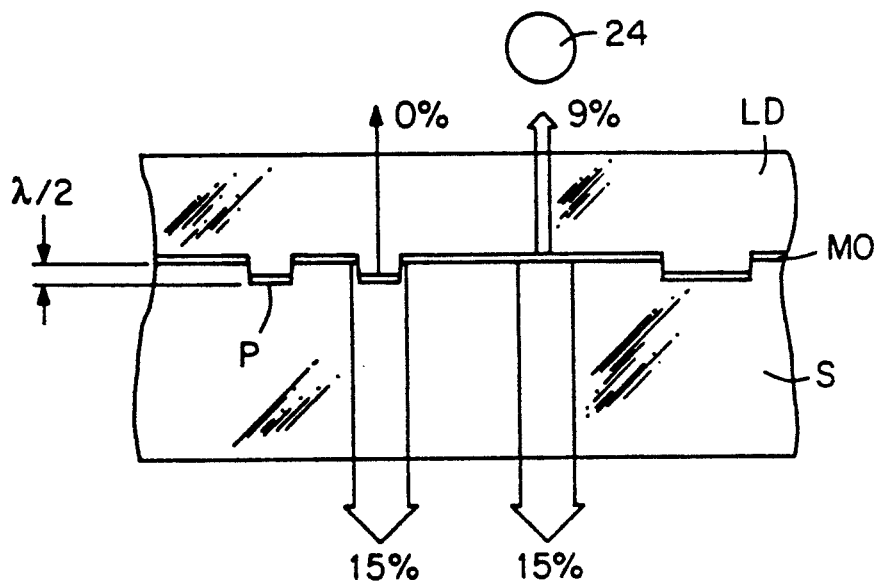
FIGS. 8 and 9 illustrate an innovative new optico-magnetic recorded medium.
Figure 9:
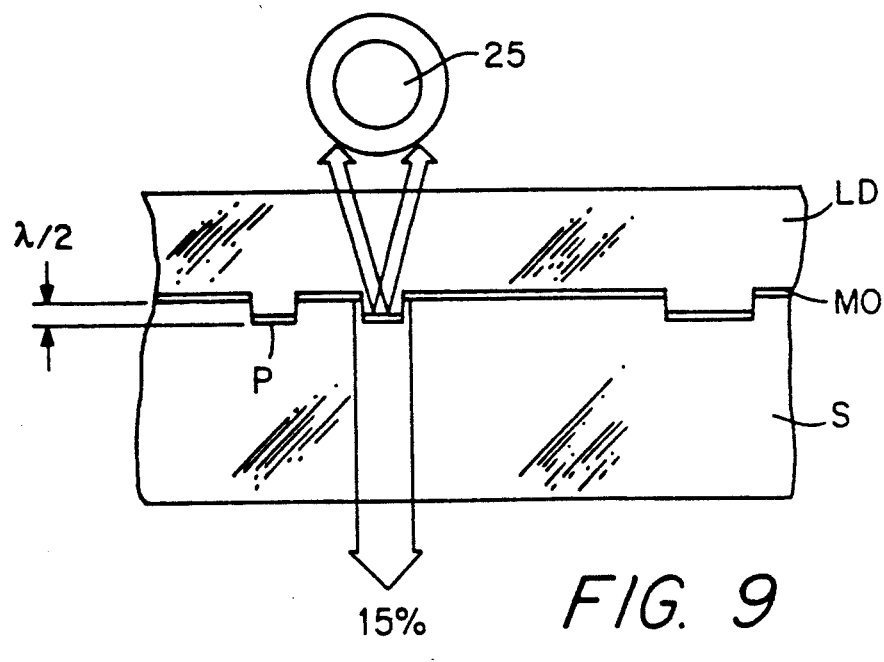

A third embodiment of the invention, appropriate for reading the new type of recorded medium illustrated in FIGS. 8 and 9 will now be specified with reference to FIG. 3.

When the optico-magnetic layer MO is approximately as thick as or thinner than the wavelength of the scanning beam of light, some of the light will penetrate it. FIG. 8 illustrates how approximately 9% of the incident light will penetrate when optico-magnetic layer MO is g/2 thick at the points where there are no depressions P, whereas approximately 15% is reflected. The rest is absorbed. Optico-magnetic layer MO is protected from damage by a transparent layer LD with an index $n_1$ of refraction of 1. There is also another protective layer S.

FIG. 9 illustrates the distribution of light at a pit P, a depression, about half as deep as the wavelength of the scanning beam of light. Approximately 15% of the incident light is reflected back. Due to the depth g/2 of the pit, however, refraction patterns will occur behind the recorded medium because, due to a path difference of g/6, the components of the light that shine through a depression will interfere with the components that shine through the thicker layer around the depression. There is a transparent layer LD to protect optico-magnetic layer MO from damage, scratches for example.

Since, due to the pit depth of g/2, the path difference between the light reflected from land and from a depression is g/2+g/2=g, the light reflected at opticomagnetic layer MO and scanning the data stored in the magnetic domains of the recorded medium will not be contaminated by the pattern of pits. The pit depth can also be an odd multiple of g/2 instead of g/2. All that is essential is that the path difference be g or a whole multiple thereof.

The embodiment illustrated in FIG. 3 differs from that illustrated in FIG. 1 in that it has a photodetector 24, in the shape of a circle for example, behind recorded medium 5, with the output terminal of the photodetector connected to the input terminal of an amplifier 26.

Circular photodetector 24 detects pits in that in the absence of a pit approximately 9% of the light strikes the photodetector, whereas, when a pit is present, interference ideally prevents any light at all from striking it. The signal PS that represents the data stored in the pits in the recorded medium can accordingly be obtained at the output terminal of amplifier 26.

Figure 4:
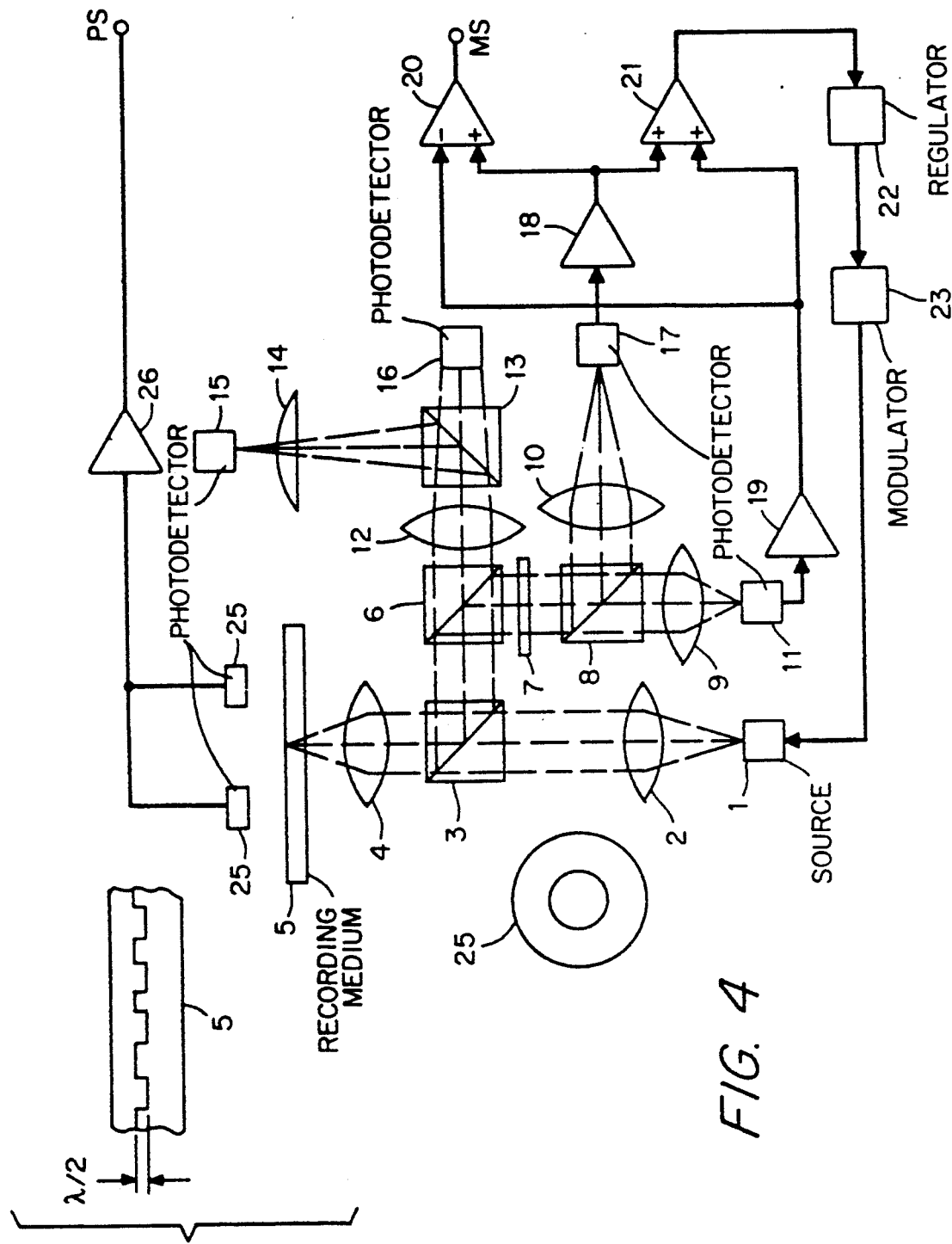
FIG. 4 illustrates a fourth embodiment of the invention.

The fourth embodiment of the invention, illustrated in FIG. 4 has a photodetector 25 in the shape of a ring for example instead of a circular photodetector. Photodetector 25 detects refraction maxima of the first order.

The data stored in the pits in the recorded medium can be detected because photodetector 25 senses refraction maxima of the first order. Whereas in the ideal case no light will strike the photodetector in the absence of a pit, the maxima will cancel out at the optical behind a pit. The signal PS that represents the data stored in the pits in the recorded medium will accordingly be available at the output terminal of amplifier 26.

Figure 5:
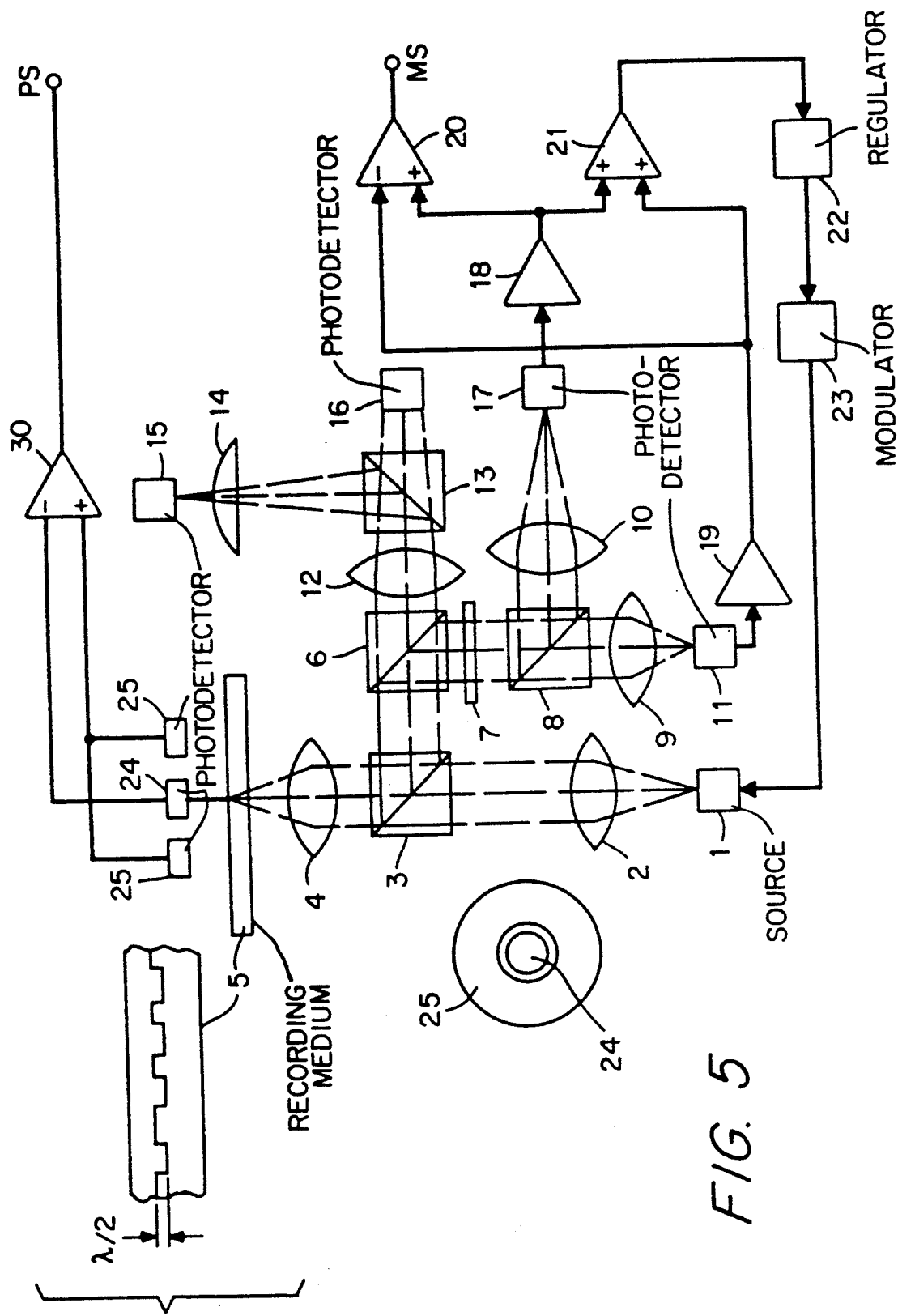
FIG. 5 illustrates a fifth embodiment of the invention.

Finally, it is also possible as in the fifth embodiment illustrated in FIG. 5, to combine both photodetector 24 and photodetector 25, with the circular photodetector 24 surrounded by annular photodetector 25. Photodetector 24 detects the unrefracted beams of light and photodetector 25 the beams that are refracted to the first order. The output terminal of circular photodetector 24 is connected to the subtracting input terminal of a differential amplifier 30 and the output terminal of annular photodetector 25 with the adding input terminal of the same amplifier. Since the signals from the two photodetectors always have different mathematical signs, the difference between the two signals that appears at the output terminal of differential amplifier 30 represents the data stored in the pits in recorded medium 5.

Summation amplifier 21, controls 22, and modulator 23 can be eliminated from the embodiments illustrated in FIGS. 3, 4, and 5. There is, however, instead of modulator 23 a laser drive to control the laser.

Figure 6:
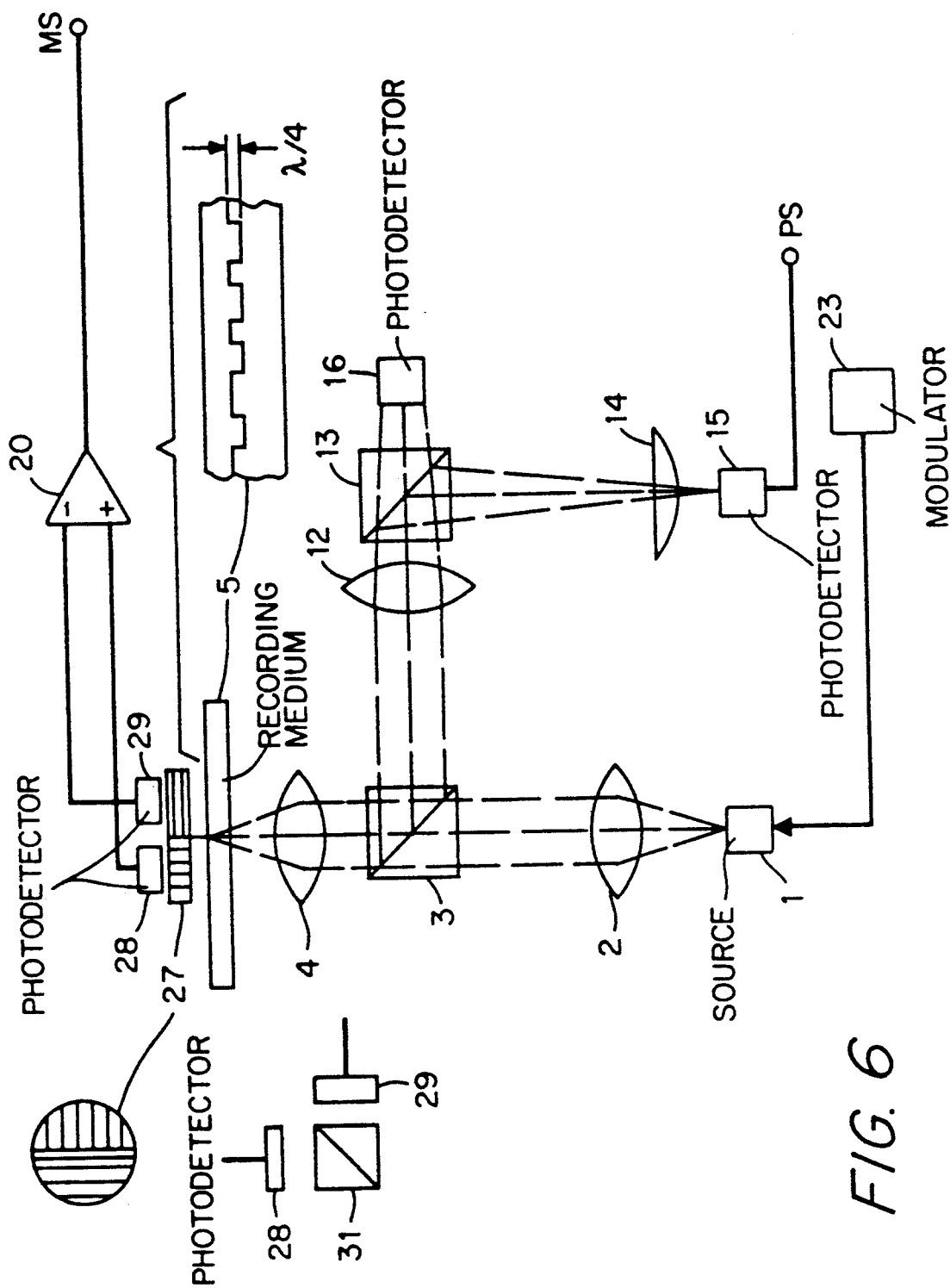
FIG. 6 illustrates a sixth embodiment of the invention.

The sixth embodiment of the invention, illustrated in FIG. 6, will now be specified.

This embodiment reads data from a recorded medium with pits that are g/4 deep. The path difference is accordingly g/2. The pits can also be any odd multiple of g/4 deep. All that is essential is that the path difference between light at a pit and the light reflected in its vicinity be g/2 or g/2+n·g, where n is a whole number.

In contrast to the optico-magnetic recorded media previously described herein, the reflected light represents the data stored in the pits in this embodiment, whereas the penetrating light represents the data stored in the magnetic domains. It is not the Kerr effect, now, but the similar Faraday effect that is exploited to read the magnetically stored data.

In the embodiment illustrated in FIG. 6, the beam of light generated by laser 1, the light ,output of which is controlled by a laser drive 23, travels through a lens 2, a prism beam divider 3, and another lens 4 to a recorded medium 5. Some of the light emitted by laser 1 is reflected back through second lens 4 to first prism beam divider 3, which diverts a beam of light through still another lens 12 and still another prism beam divider 13 onto a photodetector 16. A tracking error TE for the tracking circuit is generated from the signals leaving photodetector 16. Prism beam divider 13, however, also diverts a beam through a fourth lens 14 and onto another photodetector 15, which can be in the shape of a large square comprising four adjacent square photodiodes A, B, C, and D. A focusing error FE for the focusing circuit and the signal PS that represents the data stored in the pits in the recorded medium are obtained from the signals leaving second photodetector 15. Behind recorded medium 5 is a polarizer 27, which can be a circular or square polarizing filter. One half of polarizing filter 27 transmits only the beams of light that are polarized in one plane and the other half only the beams with a plane of polarization rotated in the other direction. Behind one half of polarizing filter 27 is a photodetector 28 and behind the other half another photodetector 29. The two photodetectors are connected to the input terminals of a differential amplifier 20.

Polarizing filter 27 transmits more light onto either photodetector 28 or photodetector 29, depending on what direction the individual magnetic domains in recorded medium 5 are magnetized in. The signal MS that represents the data stored in the magnetic domains of the recorded medium can accordingly be obtained at the output terminal of differential amplifier 20.

Figure 7:
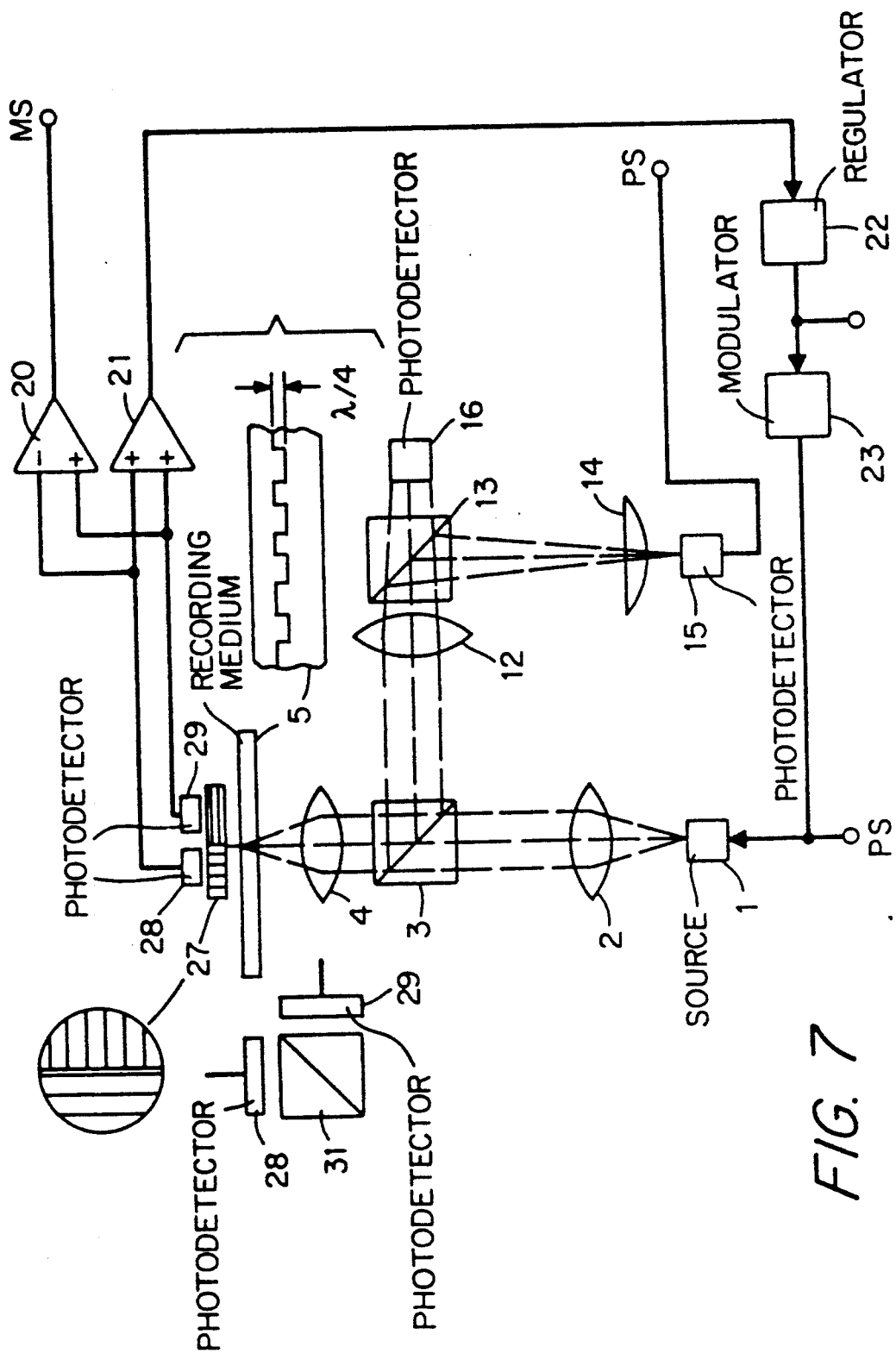
FIG. 7 illustrates a seventh embodiment of the invention.

FIG. 7 illustrates another version of the embodiment illustrated in FIG. 6. This embodiment is expanded by means of a summation amplifier 21, controls 22, and a laser drive 23. The two photodetectors 27 and 28 are connected to the input terminals of summation amplifier 21, the output terminal of which is connected to the input terminal of controls 22. The output terminal of controls 22 is connected to the input terminal of laser drive 23, the output terminal of which is connected to the control input terminal of laser 1. The intensity of the light reflected from recorded medium 5 is maintained constant in this embodiment as well by laser drive 23. The signal PS that represents the data stored in the pits in the recorded medium can accordingly be obtained at the output terminal of either controls 22 or laser drive 23. Data signal PS is also available, as in the embodiment previously discussed herein, at the output terminal of second photodetector 15.

A polarizing beam divider 31 can be employed instead of a polarizing filter, diverting the light with a polarization component rotated in one direction to photodetector 28 and the light with a polarization component in the other direction to photodetector 29.

Although less light is lost through a polarizing beam divider than through a polarizing filter, a filter is cheaper than a beam divider. A simple filter also takes up less room than a beam divider.

All of the embodiments wherein the intensity of the light reflected from the recorded medium is maintained at a constant level can also have an additional photodetector to receive the light reflected from the medium and forward its output signal to modulator 23 to modulate laser 1. It is, however, also possible to exploit the laser's monitor diode for this purpose. In this embodiment it is the signal leaving the monitor that modulates the laser.

The optical pick-up in accordance with the invention can read both the data stored in the magnetic domains and the data stored in the pits in the new type of recorded medium. It is even possible to simultaneously read the data stored in the bits and write data into the magnetic domains. A conventional compact disk or optico-magnetic disk can also be read by the optical pick-up in accordance with the invention.

Although the invention is especially appropriate for data processing because data can simultaneously be stored and read, the invention offers the advantage in relation to compact-disk players and videodisk players that both sound and pictures can be picked up simultaneously during playback. One essential advantage of the new type of recorded medium, which is a combination ROM and RAM disk, is that its storage capacity is twice that of either a ROM or a RAM disk, a compact disk or an optico-magnetic disk in other words.

What is claimed is:

1. An optical pick-up for selectively reading and writing an optical and magneto-optical recorded medium comprising: a light source projecting light on said medium; a first photodetector receiving a part of light reflected by one side of said medium; said medium having pit forms for storing data; said first photodetector having an output providing a signal representing the data stored in the pit forms in said medium; a second photodetector and a third photodetector located at another side of said medium, a part of the light emitted by said source penetrating said recorded medium and being received from said other side by one of said second photodetector and said third photodetector, said light penetrating said recorded medium having a polarity; a polarizer behind said recorded medium for diverting the light penetrating said recorded medium to one of said second photodetector and said third photodetector depending on the polarity of the light penetrating said recorded medium; a differential amplifier having inputs connected to outputs of said second photodetector and said third photodetector; said recorded medium having magnetic domains for also storing data; said differential amplifier having an output for providing a signal representing the data stored in said magnetic domains of said recorded medium.

2. An optical pick-up as defined in claim 1, including a fourth photodetector receiving light reflected from said recorded medium and having an output signal for modulating the light from said source.

3. An optical pick-up as defined in claim 1, including a first lens, a first prism beam divider, and a second lens for transmitting light from said source to said recorded medium; a polarizer behind said recorded medium; light reflected from said recorded medium traveling back through said second lens to said first prism beam divider; a third lens and a second prism beam divider for receiving light diverted by said first prism beam divider through said third lens; a fourth lens, said second prism beam divider diverting light through said fourth lens to said first photodetector; said first photodetector having an output representing data stored in said pit forms in said recorded medium and representing a focusing error for a focusing circuit; a fourth photodetector, said second prism beam divider diverting light onto said fourth photodetector, said fourth photodetector having an output corresponding to a tracking error for a tracking circuit.

4. An optical pick-up as defined in claim 1, wherein said polarizing means comprises a polarizing beam divider.

5. An optical pick-up as defined in claim 1, wherein said polarizing means comprises a polarizing filter having one half for transmitting light with a plane of polarization rotated in one direction and having another half for transmitting light with a plane of polarization rotated in another direction.

6. An optical pick-up as defined in claim 1, including means for modulating the light from said source by a sum of photovoltages of said second photodetector and said third photodetector.

7. An optical pick-up as defined in claim 6, including a summing amplifier for generating the sum of said photovoltage of said second photodetector and said third photodetector; control means, said summing amplifier having an output connected through said control means to said modulating means for controlling the light from said source, said modulating means having an output representing data stored in said pit forms in said recorded medium.

8. An optical pick-up as defined in claim 1, including means for dividing said magneto-optical signal by said optical signal, said magneto-optical signal representing the difference between said two photovoltages and said optical signal representing the sum of said photovoltages.

9. An optical pick-up as defined in claim 8, including a differential amplifier for generating the difference of said two photovoltages; a summing amplifier for generating the sum of said two photovoltages; a divider having an input connected to an output of said summing amplifier, said differential amplifier having an output connected to another input of said divider; said divider having an output signal representing data stored in said magnetic domains of said recorded medium; said summing amplifier having an output signal representing data stored in said pit forms in said recorded medium.

10. An optical pick-up as defined in clam 8, including a first lens, a first prism divider, and a second lens for transmitting light from said source to said recorded medium, light reflected by said recorded medium traveling back through said second lens to said first prism beam divider, a second prism beam divider for receiving light diverted by said first prism beam divider; a third lens, a third prism beam divider, and a fourth photodetector, said second prism beam divider diverting light through said third lens and said third prism beam divider to said fourth photodetector, said fourth photodetector having an output signal corresponding to a tracking error for a tracking circuit; a fourth lens and a fifth photodetector, said third prism beam divider diverting light through said fourth lens onto said fifth photodetector, said fifth photodetector having an output signal corresponding to a focusing error for a focusing circuit; a half-wave disk, a polarized-beam divider, and a fifth lens, said two photodetectors comprising a first photodetector and a second photodetector, said second prism beam divider diverting light through said half-wave disk, said polarized-beam divider, and said fifth lens onto said first photodetector; a sixth lens, said polarized-beam divider diverting light through said sixth lens onto said second photodetector; a first amplifier and a summing amplifier having an input connected to an output of said first photodetector through said first amplifier; a differential amplifier having a subtracting input connected to said output of said first photodetector through said first amplifier; a second amplifier, said summing amplifier having another input connected to an output of said second photodetector through said second amplifier; said differential amplifier having an adding input connected to said output of said second photodetector through said second amplifier.

11. An optical pick-up as defined in claim 1 wherein a magneto-optical signal representing data stored in the magnetic domains is obtained from the difference between photovoltages of said two photodetectors; a third photodetector behind said recorded medium and receiving light penetrating said medium and providing said optical signal representing data stored in said pit forms.

12. An optical pick-up as defined in claim 11, including a first lens, a prism beam divider, and a second lens for transmitting the light from said source to said recorded medium, light reflected by said recorded medium traveling back through said second lens to said first prism beam divider; a second prism beam divider light from said first prism beam divider being diverted to said second prism beam divider; a fourth photodetector, a third lens, and a third prism beam divider, said second prism beam divider diverting light through said third lens and said third prism beam divider to said fourth photodetector, said fourth photodetector having an output signal corresponding to a tracking error for a tracking circuit; a fifth photodetector and a fourth lens, said third prism beam divider diverting light through said fourth lens and onto said fifth photodetector, said fifth photodetector having an output signal corresponding to a focusing error for a focusing circuit; said two photodetectors comprising a first photodetector and a second photodetector; a half-wave disk, a polarized-beam divider, and a fifth lens, said second prism beam divider diverting light through said half-wave, said polarized-beam divider, and said fifth lens onto said first photodetector; a sixth lens, said polarized-beam divider diverting light through said sixth lens and onto said second photodetector; a first amplifier and a differential amplifier, said first photodetector having an output connected through said first amplifier to a subtracting input of said differential amplifier; a second amplifier, said second photodetector having an output connected through said second amplifier to an adding input of said differential amplifier, said differential amplifier having an output signal representing data stored in said magnetic domains of said recorded medium.

13. An optical pick-up as defined in claim 11, including a first lens, a first prism beam divider, and a second lens for transmitting the light from said source to said recorded medium, light reflected by said recorded medium traveling back through said second lens to said first prism beam divider; a second prism beam divider for receiving light diverted from said first beam divider; a third lens, a third prism beam divider and a fourth photodetector, said second prism beam divider diverting light through said third lens and said third prism beam divider to said fourth photodetector, said fourth photodetector having an output corresponding to a tracking error for a tracking circuit; a fourth lens and a fifth photodetector, said third prism beam divider diverting light through said fourth lens onto said fifth photodetector, said fifth photodetector having an output corresponding to a focusing error for a focusing circuit; said two photodetectors comprising a first photodetector and a second photodetector; a half-wave disk, a polarized-beam divider, and a fifth lens, said second prism beam divider diverting light through said half-wave disk, said polarized-beam divider, and said fifth lens onto said first photodetector; a sixth lens, said polarized-beam divider diverting light through said sixth lens onto said second photodetector; a first amplifier and a summing amplifier, said first photodetector having an output connected through said first amplifier to an input of said summing amplifier; a differential amplifier having a subtracting input connected to said output of said first photodetector through said first amplifier; a second amplifier, said second photodetector having an output connected through said second amplifier to another input of said summing amplifier and to an adding input of said differential amplifier; modulator means and control means, said summing amplifier having an output connected through said control means to said modulator means; said modulator means having an output connected to a control input of said light source; said differential amplifier having an output representing data stored in said magnetic domains of said recorded medium; said modulator means having an output representing data stored in the pit forms in said recorded medium.

14. An optical pick-up as defined in claim 11, wherein said third photodetector behind said recorded medium has a circular shape.

15. An optical pick-up as defined in claim 14, including an amplifier with an input connected to an output of said third photodetector behind said recorded medium, said amplifier having an output providing said optical signal representing data stored in said pit forms.

16. An optical pick-up as defined in claim 11, wherein said third photodetector behind said recorded medium detects refraction maxima.

17. An optical pick-up as defined in claim 16, wherein said third photodetector behind said recorded medium has an annular shape.

18. An optical pick-up as defined in claim 11, wherein said third photodetector has a circular shape; a fourth photodetector having an annular shape and surrounding said third photodetector behind said recorded medium, said fourth photodetector detecting refraction maxima.

19. An optical pick-up as defined in claim 18, including a differential amplifier with inputs connected to said third photodetector and said fourth photodetector, said amplifier having an output providing said optical signal representing data stored in said pit forms in said recorded medium.

* * * * *